United States Patent
Han et al.

(10) Patent No.: US 11,412,181 B1
(45) Date of Patent: Aug. 9, 2022

(54) SYSTEMS AND METHODS FOR SHARING CONTENT ACROSS VIDEOCONFERENCING SUB-MEETINGS

(71) Applicant: Zoom Video Communications, Inc., San Jose, CA (US)

(72) Inventors: Lin Han, Los Altos, CA (US); Nitasha Walia, Sunnyvale, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/214,306

(22) Filed: Mar. 26, 2021

(51) Int. Cl.
*H04N 7/15* (2006.01)
*H04L 65/401* (2022.01)

(52) U.S. Cl.
CPC ......... *H04N 7/155* (2013.01); *H04L 65/4015* (2013.01)

(58) Field of Classification Search
CPC .......... H04N 7/15; H04N 7/152; H04N 7/147; H04N 7/14; H04L 29/06; H04L 65/4015; G09B 5/10
USPC ........................................... 348/14.01–14.16
See application file for complete search history.

(56) References Cited

U.S. PATENT DOCUMENTS

| | | | | |
|---|---|---|---|---|
| 2006/0164507 A1* | 7/2006 | Eshkoli | ................ | H04L 65/403 348/14.09 |
| 2008/0153471 A1* | 6/2008 | Paik | ........................ | H04N 7/14 455/415 |
| 2014/0132701 A1* | 5/2014 | Wang | .................. | H04L 12/1827 348/14.08 |
| 2016/0088259 A1 | 3/2016 | Anderson et al. | | |
| 2016/0321936 A1* | 11/2016 | Laine | ....................... | G09B 5/10 |
| 2018/0375676 A1 | 12/2018 | Bader-Natal et al. | | |
| 2020/0302817 A1* | 9/2020 | Williams | ................. | G09B 5/10 |

FOREIGN PATENT DOCUMENTS

CN 111478905 A 7/2020

OTHER PUBLICATIONS

PCT/US2022/019071, "International Search Report and Written Opinion", dated May 25, 2022, 12 pages.

* cited by examiner

*Primary Examiner* — Melur Ramakrishnaiah
(74) *Attorney, Agent, or Firm* — Kilpatrick Townsend & Stockton LLP

(57) ABSTRACT

One example system for sharing content across videoconferencing sub-meetings includes a processor and at least one memory device. The memory device includes instructions that are executable by the processor to cause the processor to establish a videoconferencing session including a main meeting and a first sub-meeting, receive, from a presenter, a content to be displayed in the main meeting, and cause the content to be displayed in the main meeting. The memory device further includes instructions that are executable by the processor to cause the processor to receive, from a first participant in the videoconferencing session, an indication that the content is to be displayed in the first sub-meeting, and cause the content to be displayed in the first sub-meeting simultaneously with the content in the main meeting.

20 Claims, 6 Drawing Sheets

SYSTEMS AND METHODS FOR SHARING CONTENT ACROSS VIDEOCONFERENCING SUB-MEETINGS

FIELD

The present application generally relates to videoconferences and more particularly relates to systems and methods for sharing content across videoconferencing sub-meetings.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

SUMMARY

Various examples are described for systems and methods for sharing content across videoconferencing sub-meetings. One example system includes a processor and at least one memory device. The memory device includes instructions that are executable by the processor to cause the processor to establish a videoconferencing session including a main meeting and a first sub-meeting, receive, from a presenter, a content to be displayed in the main meeting, and cause the content to be displayed in the main meeting. The memory device further includes instructions that are executable by the processor to cause the processor to receive, from a first participant in the videoconferencing session, an indication that the content is to be displayed in the first sub-meeting, and cause the content to be displayed in the first sub-meeting simultaneously with the content in the main meeting.

One example method includes establishing a videoconferencing session associated with a host. The videoconferencing session includes a main meeting and a first sub-meeting. The method further includes receiving, from a presenter, a content to be displayed in the main meeting, receiving, from a first participant in the videoconferencing session, an indication that the content is to be displayed in the first sub-meeting, and causing the content to be displayed in the first sub-meeting meeting simultaneously with the content in the main meeting.

One example non-transitory computer-readable medium includes code that is executable by a processor for causing the processor to establish a videoconferencing session including a main meeting and a first sub-meeting, receive, from a presenter, a content to be displayed in the main meeting, and cause the content to be displayed in the main meeting. The non-transitory computer-readable medium further includes code that is executable by a processor for causing the processor to receive, from a first participant in the videoconferencing session, an indication that the content is to be displayed in the first sub-meeting, and cause the content to be displayed in the first sub-meeting simultaneously with the content in the main meeting.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
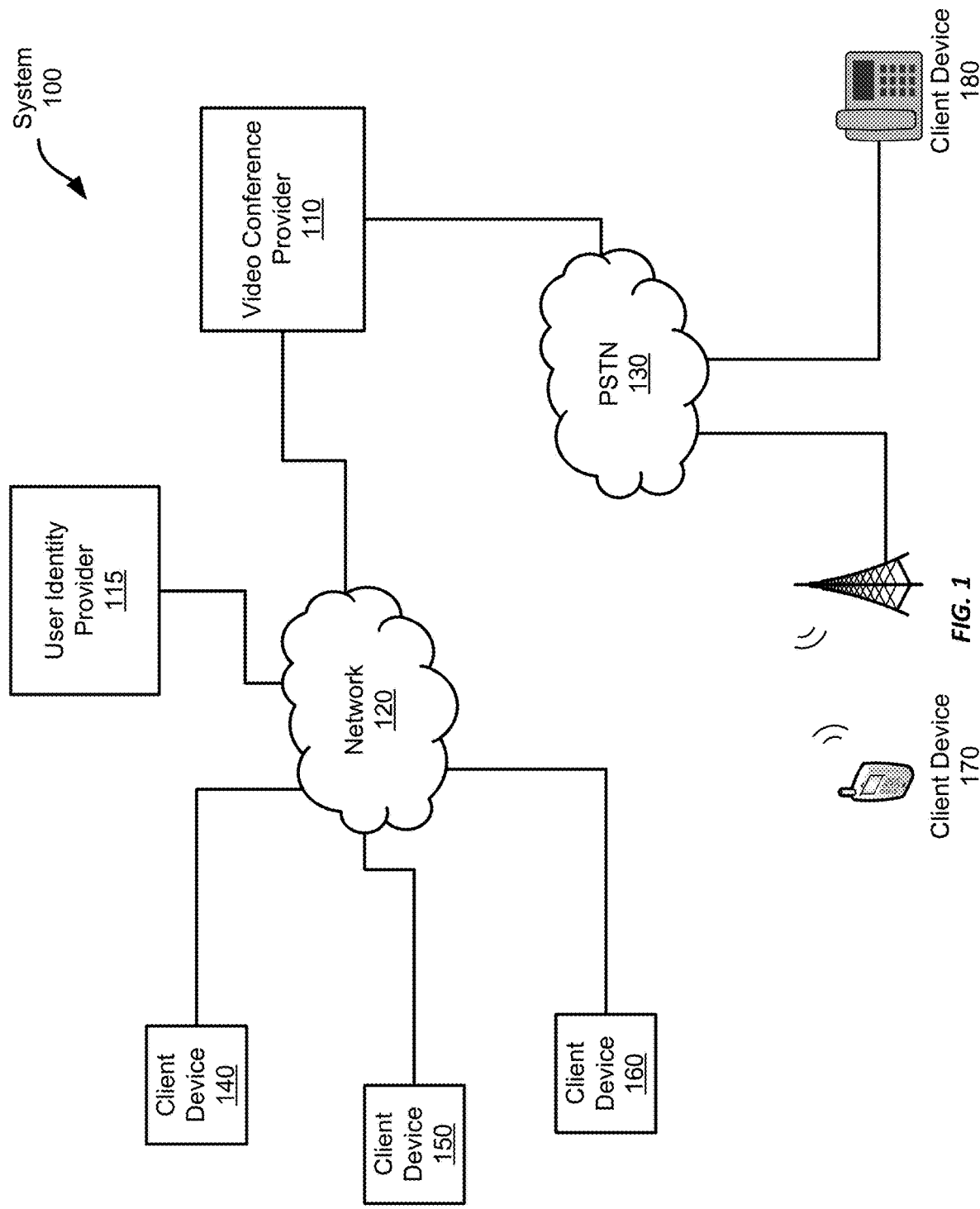
FIGS. 1-4 illustrate example systems to enable waiting notifications for videoconferencing sub-meetings.

Examples are described herein in the context of systems and methods for sharing content across videoconferencing sub-meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "host" or "meeting host") accesses the videoconferencing system, sets parameters for the new meeting, such as a start and end time, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session. This control and management typically includes managing sub-meetings, sometimes referred to as "breakout rooms." Sub-meeting commands may include commands to start a sub-meeting, move participants into a sub-meeting, move participants out of a sub-meeting, or end the sub-meeting.

Often, participants in meetings share content with one another. For instance, a participant in a meeting might choose to share content that appears on the user's screen. In the example system, the host or a participant in the main meeting room may want to share content simultaneously in the main meeting room and in one or more of the sub-meeting rooms.

For example, a meeting may be established for a virtual class. All the students initially join the main meeting. Subsequently, the students are divided in to study groups. For each study group, a sub-meeting is created. Each study group can have multiple student participants. The student participants move from the main meeting to the appropriate sub-meeting for that student's study group. In the example system, the video conference provider establishes multiple channels for each meeting and each sub-meeting.

A channel is a bi-directional link that allows data to flow from the server to the client or from client to server. Such channels can be used to transmit control signals, carry video conferencing streams, exchange two-way messages, or convey content from server to client or client to server. For instance, data, such as video data, is sent over a data channel. The video conference provider establishes a separate data channel for the main meeting and each sub-meeting. A participant in a particular meeting receives the data by "subscribing" to the data channel. In the example system, when a user moves from the main meeting to the sub-meeting and subscribes to that meetings data channel or channels. However, the user is also still associated with the main meeting and can subscribe to the data channel or channels associated with the main meeting.

At some point during the class, the instructor wishes to provide a test to all of the students in all of the various study groups simultaneously. In the example system, the instructor clicks a button on the videoconference control interface to share the test in the main meeting and each of the sub-meetings simultaneously. The content is sent over a data channel associated with the main meeting. And because the student is associated with the main meeting, the student is able to subscribe to the data channel for the main meeting and thus receives the content while participating in the sub-meeting. Accordingly, the student experiences the shared content as if it were being shared in the student's sub-meeting. However, because the student is receiving the content over the same channel as participants in the main meeting, the same content is shared across the main meeting and the sub-meeting(s) and appears simultaneously.

Participants in the sub-meeting are able to interact with the content in various ways. For instance the participants in a sub-meeting may take control of a presentation and iterate through slides or pages. In one example, a user in a sub-meeting may wish to annotate the content, such as by answering a question on a test. Because the data channel that contains the content is shared across the main meeting and various sub-meetings, any annotations the user makes on the shared content is in turn shared in the main meeting and any sub-meetings.

Such video conferencing systems provide numerous advantages. For example, participants in one meeting are typically only able to view content for that meeting. However, in the examples described herein, participants in a sub-meeting, are able to view content from another meeting, the main meeting, without having to have the entirety of both meetings displayed simultaneously, and thus without the distraction of having to potentially view all the participants from all of the related meetings in order to view the shared content. Further, allowing the simultaneous sharing of content across multiple meetings ensures that presentation of the content among the various rooms is synchronized. Examples by allowing participants to access data connections to multiple meetings simultaneously, the provision of content to multiple meetings is simplified.

This illustrative example is given to introduce the reader to the general subject matter discussed herein and the disclosure is not limited to this example. The following sections describe various additional non-limiting examples and examples of systems and methods for sharing content across videoconferencing sub-meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in videoconferences hosted by the video conference provider 110. For example, the video conference provider 110 can be located within a private network to provide videoconferencing services to devices within the private network, or it can be connected to a public network, e.g., the internet, so it may be accessed by anyone. Some examples may even provide a hybrid model in which a video conference provider 110 may supply components to enable a private organization to host private internal videoconferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
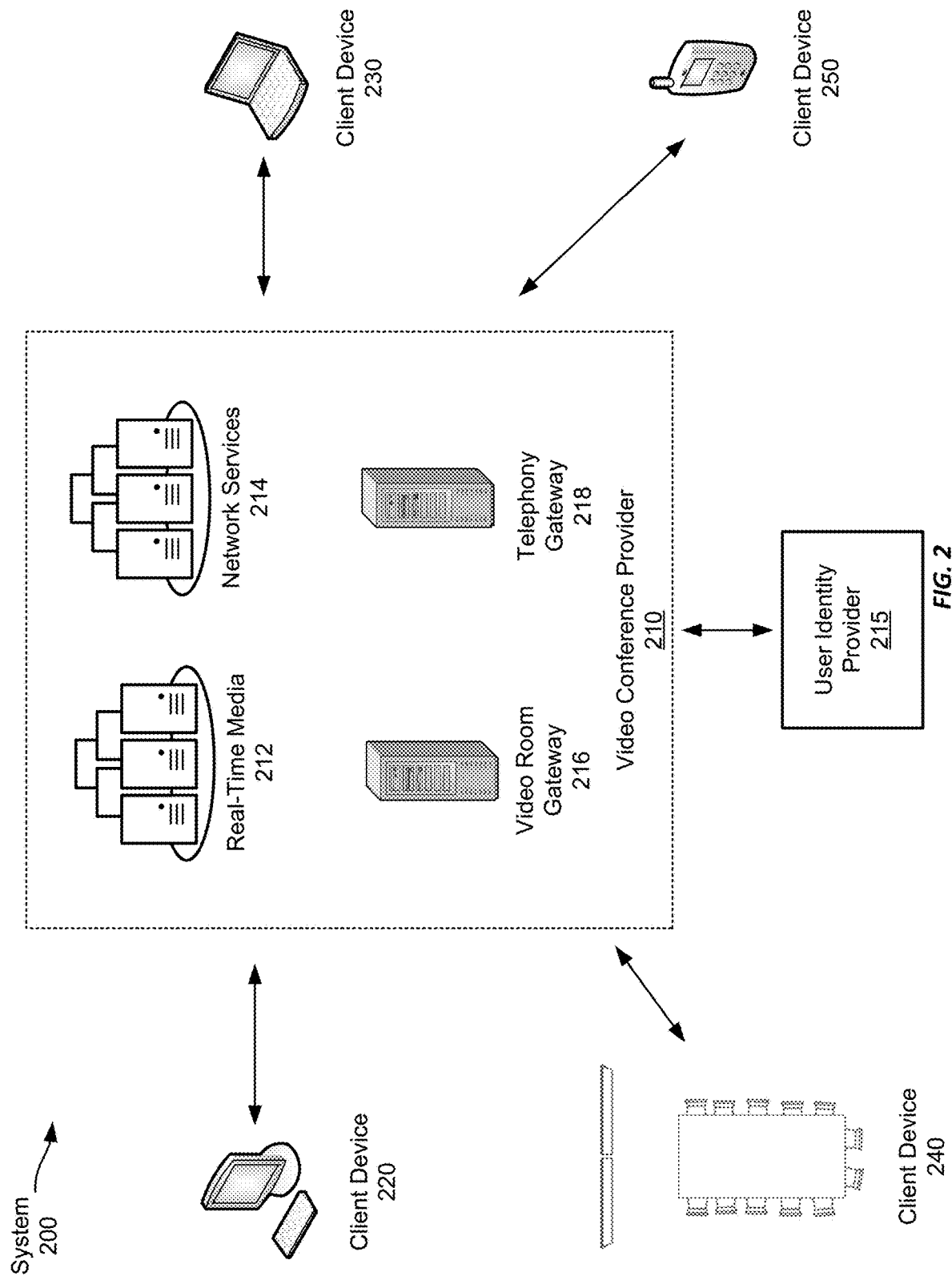

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated videoconferencing equipment. Each of these devices may provide both audio and video capabilities and may enable one or more users to participate in a videoconference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based videoconferencing hardware to dedicated videoconferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of videoconference functionality, thereby enabling the various client devices to create and participate in videoconference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "breakout" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a breakout room for one or more meeting participants to join, such a command may also be handled by a network services server 214, which may create a new meeting record corresponding to the breakout room and then connect one or more meeting participants to the breakout room similarly to how it originally admitted the participants to the meeting itself.

In addition to creating and administering on-going meetings, the network services server(s) 214 may also be responsible for closing and tearing down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conference providers according to this description.

Referring now to the video room gateway servers 216, these servers 216 provide an interface between dedicated videoconferencing hardware, such as may be used in dedicated videoconferencing rooms. Such videoconferencing hardware may include one or more cameras and microphones and a computing device designed to receive video and audio streams from each of the cameras and microphones and connect with the video conference provider 210. For example, the videoconferencing hardware may be provided by the video conference provider to one or more of its subscribers, which may provide access credentials to the videoconferencing hardware to use to connect to the video conference provider.

The video room gateway servers 216 provide specialized authentication and communication with the dedicated videoconferencing hardware that may not be available to other client devices 220-230, 250. For example, the videoconferencing hardware may register with the video conference provider when it is first installed and the video room gateway may authenticate the videoconferencing hardware using such registration as well as information provided to the video room gateway server(s) 216 when dedicated videoconferencing hardware connects to it, such as device ID information, subscriber information, hardware capabilities, hardware version information etc. Upon receiving such information and authenticating the dedicated videoconferencing hardware, the video room gateway server(s) 216 may interact with the network services servers 214 and real-time media servers 212 to allow the videoconferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
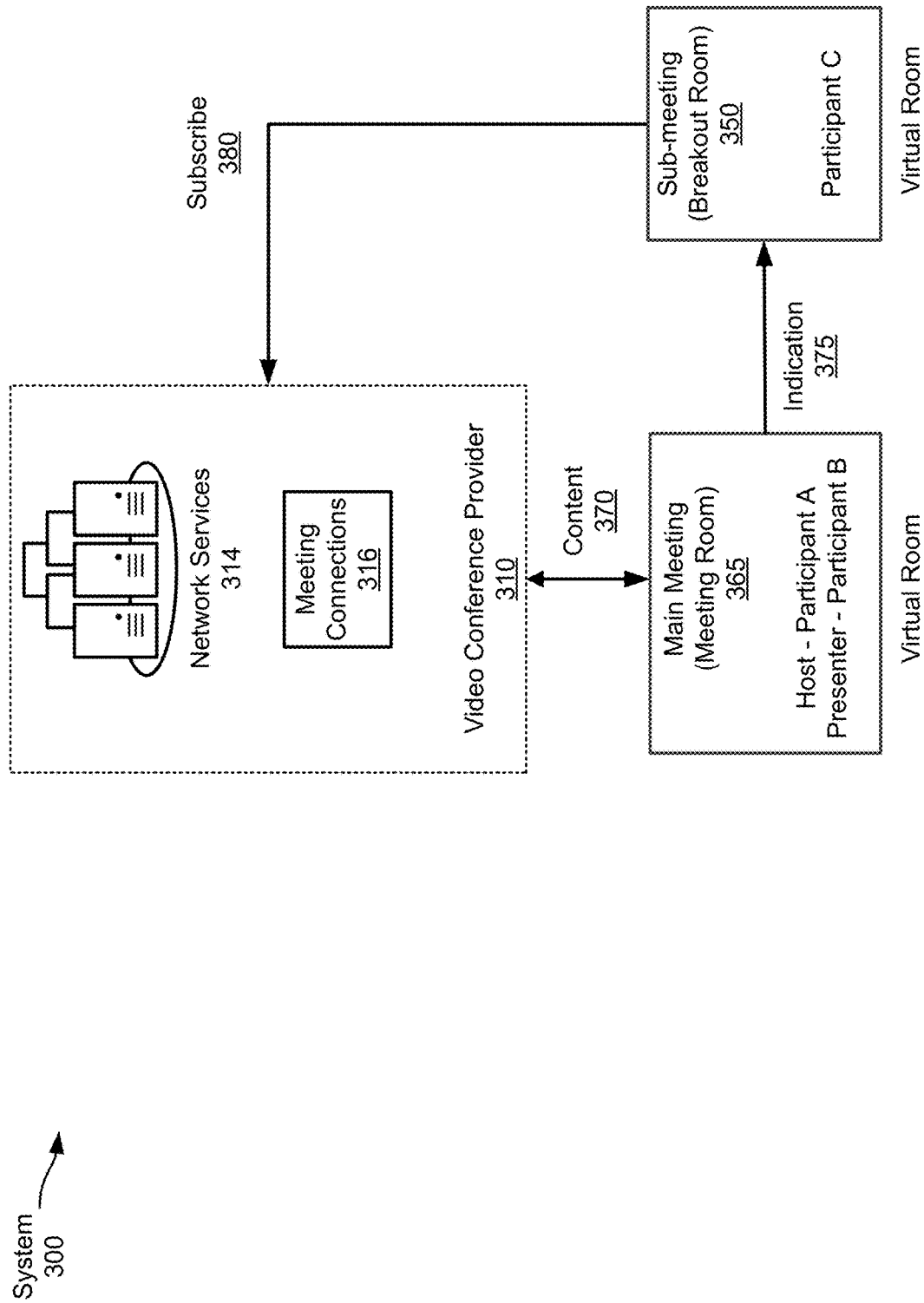

Referring to FIG. 3, FIG. 3 shows another example system 300 for sharing content across videoconferencing sub-meetings. Example system 300 includes video conference provider 310 and network services server(s) 314. Resources of the video conference provider 310 can include stored meeting connections 316. The stored meeting connections include identifiers for each participant and host as well as meetings to which each participant and host is subscribed. A subscription to a meeting can be for one or more multimedia data streams (e.g., audio or video streams) and/or control streams. A participant or host, through a client device, can be subscribed to multiple meetings, e.g., the host can be subscribed to control streams from one meeting and can also be subscribed to multimedia streams from another meeting. Thus, a subscription to a meeting may involve being subscribed to multiple different data streams associated with that meeting. The stored meeting connections provide a reference that can be used for messaging and other services to determine which streams a particular participant (whether a host or not) is subscribed to. Client devices for these participants are connected to the meeting servers, including network services servers 314 using TCP or UDP. For example, a service connection that includes, for example, a command channel, may be maintained using TCP and data may be exchanged over a data channel using UDP. For example, for purposes of a host being able to receive notifications while in a breakout room, a stored meeting connection of the host to the main meeting ensures that the host is treated as part of the main meeting for messaging purposes when the host is participating in a sub-meeting.

System 300 in this example is maintaining a main meeting 365 including the host, participant A, and a presenter, participant B. System 300 is also maintaining a sub-meeting (breakout room) 350 including participant C. The main videoconferencing meeting 365 can be presented to users as a virtual meeting room with visual representations of some or all of the participants provided either by their respective video feed or an identifier, such as their name. Sub-meeting 350 can be presented to users as a virtual breakout room, similarly to how the main meeting is presented to users. System 300 can create additional sub-meetings as needed. Each virtual room includes participants, the identities of which can be accessed and presented as a list in a user interface displayed by client devices with appropriate display capabilities. The experience of videoconferencing using virtual rooms thus substantially replicates the experience of holding a gathering in a main conference room in which participants divide into groups and meet in additional conference rooms or offices. While system 300 only includes a main meeting and one sub-meeting, other examples may include multiple sub-meetings, and sub-meetings may include a hierarchy that is deeper than the two-level hierarchy illustrated in FIG. 3. In other words, sub-meetings may be divided into sub-sub-meetings in various examples.

In system 300, once the videoconferencing session associated with a host has been established, the presenter can then share content with the participants in the main meeting. The content 370 is communicated to the video conference provider 310 and then distributed to all the participants in the main meeting 365. For example, the presenter may enable screen sharing so that participants in the main meeting can view a slide show presentation on presenter's client device. Each participant in the main meeting receives the content 370 by virtue of their subscription to the main meeting.

In system 300, the host or another participant in the main meeting can indicate that the content 370 is also to be shared with sub-meetings. The indication 375 that the content is to be shared with the sub-meeting 350 is then transmitted to the sub-meeting. Participants of the sub-meeting 350, such as participant C, receive the indication 375. For example, the users in the sub-meeting 350 may all receive a commend message indicating that the content 370 is to be sent in a data channel. In system 300, participants in the sub-meeting 350 can then then subscribe to the data stream for the main meeting, which causes a subscribe message 380 to be transmitted to the video conference provider 310, which then updates the meeting connections 316 data store to reflect the subscription. From that point, participants in the sub-meeting 350 are able to view the content 370 from the presenter, while participants in the main meeting 365 view the same content. In some examples, the content might include some indication that it originates in another room or that it is shared across rooms. For example, the content might be displayed under a banner having a certain color or having a header indicating that it is shared across meetings.

In the example of system 300, when participant C enters the sub-meeting 350, participant C subscribes to the sub-meeting 350, e.g., a connection is established between participant C and one or more data or control streams associated with the sub-meeting 350. In addition, in the example where content is shared in the main meeting 365 and the sub-meeting 350, participant C is also subscribed to the main meeting 365, or at least subscribed to the data stream associated with the main meeting 365 that contains or is used to transmit the content 370.

Figure 4:
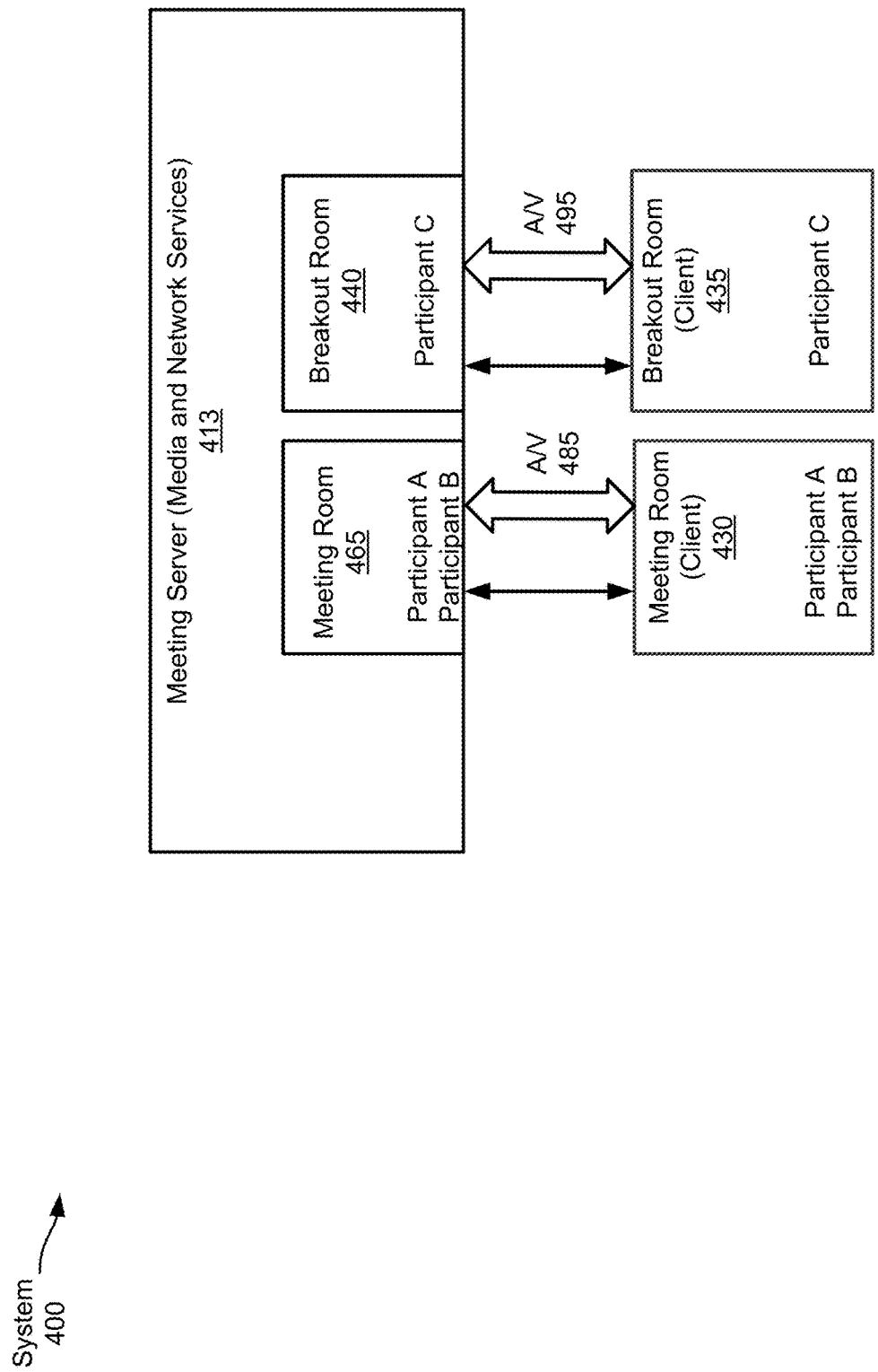

Referring to FIG. 4, FIG. 4 shows another example system 400 for sharing content across videoconferencing sub-meetings. Example system 400 includes meeting server 413. Meeting server 413 may also be referred to as a multimedia router and can be implemented by the real-time media servers 212 working with the network services servers 214. The meeting server maintains stored representations of the meetings and sub-meetings taking place in the system so that the meeting server can keep track of the status of meetings and sub-meetings without constantly exchanging this information with client devices. Some client devices also maintain stored representations of the meetings or sub-meetings to which the associated participant or host is subscribed so that virtual meeting rooms can be displayed to the user. System 400 includes a main meeting room representation 430 on a client device, and a main meeting room representation 465 on meeting server 413. In this example, the host, participant A, and a presenter, participant B, are visible in the main meeting room. In system 400, the participants A and B maintain a connection to the main meeting room specified in meeting connections 316.

System 400 also includes breakout room representation 435 maintained on a client device and breakout room representation 450 maintained on meeting server 413. The breakout room includes participant C. Since current meeting participants are in the main meeting room and the breakout room, communication with both room includes a media connection, audio/video (A/V) streams 485 and 495, through which shared content 370 can be provided to participants in both rooms simultaneously.

Figure 5:
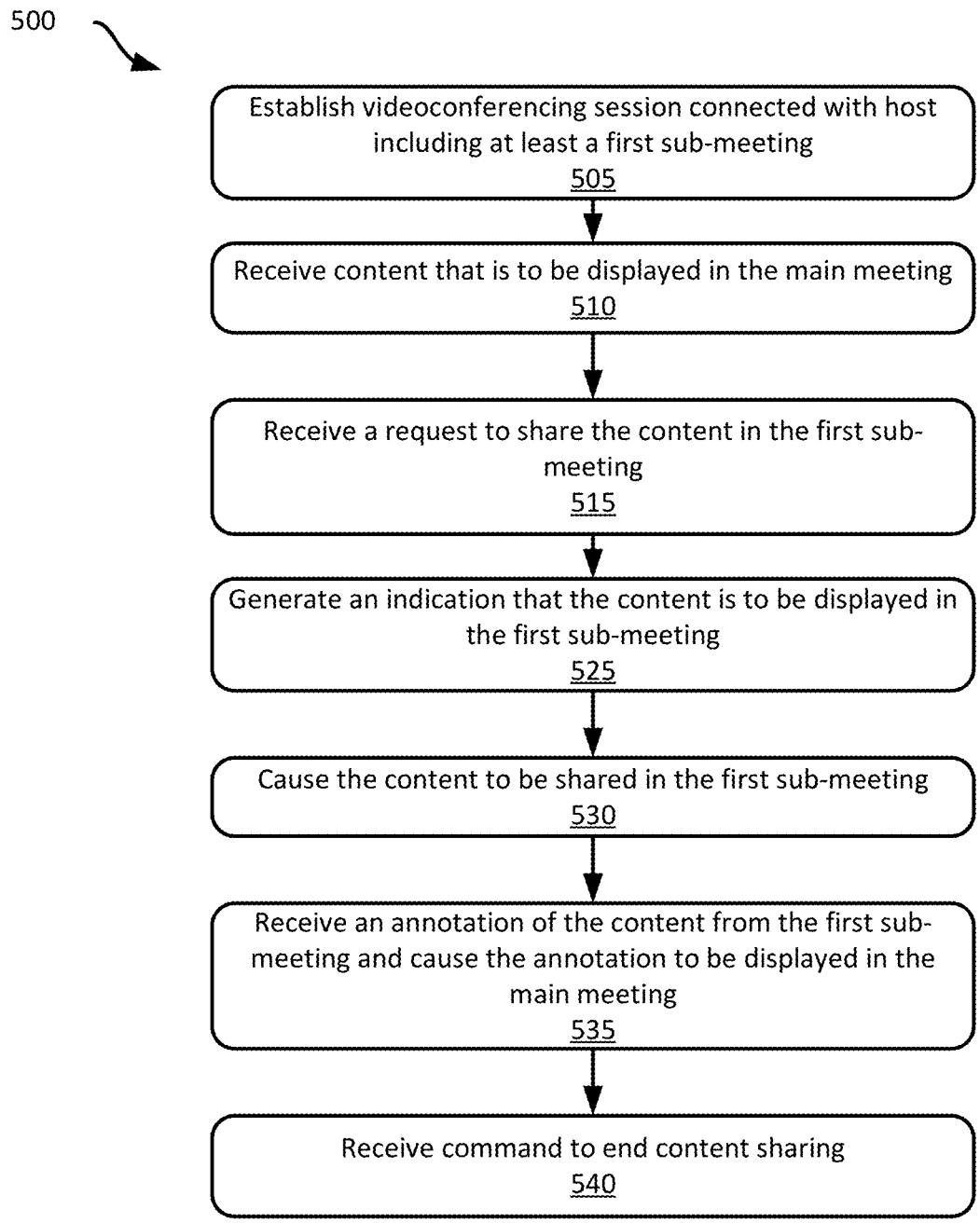
FIG. 5 illustrate example methods for providing waiting notifications for videoconferencing sub-meetings.

Referring now to the method 500 illustrated in FIG. 5, FIG. 5 shows an example method 500 for sharing content across videoconferencing sub-meetings. The description of the method 500 in FIG. 5 will be made with reference to the system 300 shown in FIG. 3; however any suitable system according to this disclosure may be used, such as the example systems 100, 200, and 400 shown in FIGS. 1, 2, and 4.

At block 505, a processor at video conference provider 310 establishes a videoconferencing session including a main meeting and at least a first sub-meeting. The videoconferencing session is associated with at least one host within meeting connections 316. The videoconferencing session is also associated with a presenter in at least one of the meeting or first sub-meeting that will present content. Participants subscribe to channels that are associated with the particular meeting in which they are participating. For example, the main meeting may have a command and a data channel associated with it. The client of a participant in the main meeting subscribes to those two channels to allow the client to send and receive commands and take part in the video conference. For example, each channel may be associated with an identifier, and the client uses the identifier in order to connect to the channel. In the example process shown in FIG. 5, a participant in a sub-meeting is also associated with the main meeting and so is able to subscribe to channels associated with either the main meeting or the sub-meeting.

At block 510, the presenter provides content to the video conference provider 310. For example, the presenter may indicate that the presenter is sharing her screen or sharing a video feed from another source. When the presenter shares her screen, the content from her screen is then shared with the video conference provider 310 as a new data stream, or as a substitute data stream to her own video feed from her camera, as well as other participants in the virtual meeting room in which the presenter is present. In this example, the presenter is virtually present in the main meeting 365. For example, the main meeting 365 and sub-meeting 350 may be associated with a classroom. And the content may be a test to be taken by the students in the classroom.

At block 515, the video conference provider receives an indication that the content is to be shared with a first sub-meeting 350. For example, the host of the meeting may select a control indicating that the content is to be shared in the main meeting room 350 and the first sub-meeting room 350 simultaneously. The control may allow the presenter to select the main meeting or one or more sub-meetings to share the content with. In the classroom example, the instructor may wish that all students, including those in the main and sub-meetings, take the test at the same time. Thus the content is to be shared simultaneously in the main meeting room 365 as well as the first sub-meeting room 350. To accomplish this, the presenter may select all of the available meetings and sub-meetings to receive the shared content; however, in other examples, the presenter may only share the content with a subset of the main meeting or one or more of the sub-meetings.

At block 525, an indication is generated that notifies a participant in the sub-meeting 350 that the content 370 is to be displayed in the first sub-meeting 350. The notification may include display information to be presented to the participant and it may include information to instruct the participant's client device how to receive the shared content, such as by identifying a data stream associated with the main meeting. For example, a pop-up may be displayed on participant C's client device, which is participating in the sub-meeting 350, that states that the test will be shown. In some examples, participant C may confirm that the content should be displayed and thereby subscribe to the data stream from video conference provider 310 that contains the content 370. If the participant confirms that the content should be shared, participant C's client device subscribes to the corresponding data stream from the main meeting. Alternatively, if participant C's confirmation is not required, their client device may simply subscribed to the data stream with the shared content in response to receiving the notification.

At block 530, the content is shared in the first sub-meeting 530. To do so, the video conference provider 310 transmits the data from the shared content to the main meeting's data stream. At this point, participant C is subscribed to the data stream containing the content 370 and the content is then displayed on participant C's client device. In the classroom example, participant C is now able to view the test.

In some examples, participant C can now interact with the content. In process 600, participant C can annotate the shared content 370 in the sub-meeting, and the annotations are then displayed in the sub-meeting 350 and the main meeting 365 simultaneously. In the classroom example, participant C might solve a problem on the test using an annotation tool, and the solution would be displayed to the main meeting 365 and the sub-meeting 350 participants simultaneously.

At block 540, the video conference provider 310 provides a command that the content is no longer to be shared. For instance, in the classroom example, the instructor ay indicate that the test is complete, such as by selecting a button or other control on their client device. In some examples, the shared content may have an associated timer, such as for a timed test. In one such example, when the timer expires, the video conference provider 310 stops sharing the content or instructs the participants' client devices to unsubscribe from the corresponding data stream. In another such example, the presenter's client device may notify the presenter that the timer has expired and provide an option to stop sharing the content. When the client device receives the command, it may unsubscribe or the server may shut down the data channel transmitting the content.

It should be appreciated that the example method 500 may be executed in different orders or multiple blocks may occur substantially simultaneously. For example, blocks 510 through 530 may occur multiple times during a videoconference session established at block 505. Further, block 535 may not occur during some videoconference sessions.

Figure 6:
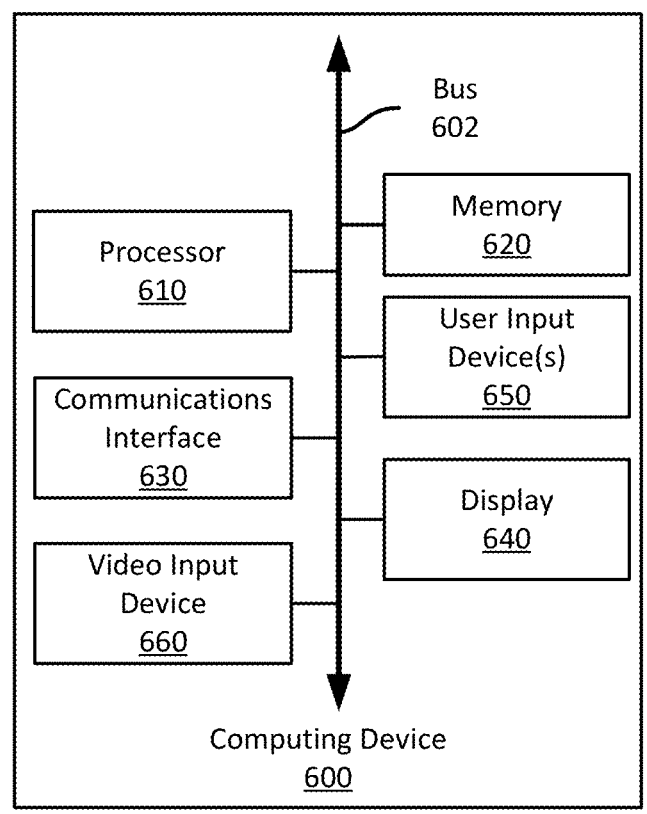
FIG. 6 shows an example computing device suitable for use with any disclosed systems or methods according to this disclosure.

Referring now to FIG. 6, FIG. 6 shows an example computing device 600 suitable for use in example systems or methods for sharing content across videoconferencing sub-meetings. The example computing device 600 includes a processor 610 which is in communication with the memory 620 and other components of the computing device 600 using one or more communications buses 602. The processor 610 is configured to execute processor-executable instructions stored in the memory 620 to perform one or more methods for providing waiting notifications and managing a waiting queue according to different examples, such as part or all of the example method 500 described above with respect to FIG. 5. The computing device, in this example, also includes one or more user input devices 650, such as a keyboard, mouse, touchscreen, video input device (e.g., one or more cameras), microphone, etc., to accept user input. The computing device 600 also includes a display 640 to provide visual output to a user as well as a video input device 660, such as a camera, to capture visual input.

The computing device 600 also includes a communications interface 630. In some examples, the communications interface 630 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A system comprising:
a processor; and
at least one memory device including instructions that are executable by the processor to cause the processor to:
establish a videoconferencing session including a main meeting and a first sub-meeting;
receive, from a presenter, a content transmitted over a data stream to be displayed in the main meeting;
cause the content to be displayed in the main meeting;
receive, from a first participant in the videoconferencing session, an indication that the content is to be displayed in the first sub-meeting;
receive, from a second participant, a request to subscribe to the data stream over which the content is transmitted; and
cause the content to be displayed in the first sub-meeting simultaneously with the content in the main meeting.

2. The system of claim 1, where the content comprises a screen share.

3. The system of claim 1, wherein the instructions are executable by the processor to further cause the processor to notify the second participant in the sub-meeting that the content is available.

4. The system of claim 1, wherein the instructions are executable by the processor to further cause the processor to establish a second sub-meeting cause the content to be displayed in the second sub-meeting.

5. The system of claim 1, wherein the instructions are executable by the processor to further cause the processor to:
receive an annotation of the content from the first sub-meeting; and
cause the annotation to be displayed on the content in the main meeting.

6. The system of claim 1, wherein the content is received over a data channel associated with the main meeting.

7. The system of claim 6, wherein the indication is received over a command channel.

8. A method comprising:
establishing a videoconferencing session including a main meeting and a first sub-meeting;
receiving at a server, from a presenter, a content transmitted over a data stream to be displayed in the main meeting;
receiving at the server, from a first participant in the videoconferencing session, an indication that the content is to be displayed in the first sub-meeting;

receiving at the server, from a second participant, a request to subscribe to the data stream over which the content is transmitted; and causing the content to be displayed in the first sub-meeting simultaneously with the content in the main meeting.

9. The method of claim 8, where the content comprises a screen share.

10. The method of claim 8, further comprising notifying the second participant in the sub-meeting that the content is available.

11. The method of claim 8, further comprising:
establishing a second sub-meeting; and
causing the content to be displayed in the second sub-meeting.

12. The method of claim 8, further comprising:
receiving at the server an annotation of the content from the first sub-meeting; and
causing the annotation to be displayed on the content in the main meeting.

13. The method of claim 8, wherein the content is received over a data channel associated with the main meeting.

14. The method of claim 13, wherein the indication is received over a command channel.

15. A non-transitory computer-readable medium comprising code that is executable by a processor for causing the processor to:
establish a videoconferencing session including a main meeting and a first sub-meeting;
receive, from a presenter, a content transmitted over a data stream to be displayed in the main meeting;
cause the content to be displayed in the main meeting;
receive, from a first participant in the videoconferencing session, an indication that the content is to be displayed in the first sub-meeting;
receiving, from a second participant, a request to subscribe to the data stream over which the content is transmitted; and
cause the content to be displayed in the first sub-meeting simultaneously with the content in the main meeting.

16. The non-transitory computer-readable medium of claim 15, where the content comprises a screen share.

17. The non-transitory computer-readable medium of claim 15, wherein the instructions are executable by the processor to further cause the processor to notify the second participant in the sub-meeting that the content is available.

18. The non-transitory computer-readable medium of claim 15, wherein the instructions are executable by the processor to further cause the processor to establish a second sub-meeting cause the content to be displayed in the second sub-meeting.

19. The non-transitory computer-readable medium of claim 15, wherein the instructions are executable by the processor to further cause the processor to:
receive an annotation of the content from the first sub-meeting and cause the annotation to be displayed on the content in the main meeting.

20. The non-transitory computer-readable medium of claim 19, wherein the content is received over a data channel associated with the main meeting and the indication is received over a command channel.

\* \* \* \* \*